(12) United States Patent
Fieschi et al.

(10) Patent No.: US 7,769,697 B2
(45) Date of Patent: *Aug. 3, 2010

(54) METHOD FOR VALIDATING AN ELECTRONIC PAYMENT BY A CREDIT/DEBIT CARD

(75) Inventors: Jacques Fieschi, St Laurent du Var (FR); Jean-Francois Le Pennec, Nice (FR); Patrick Michel, La Gaude (FR); Pascal Roy, Biot (FR)

(73) Assignee: International Busniess Machines Corporation, Armonk, NY (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/530,736

(22) Filed: Sep. 11, 2006

(65) Prior Publication Data

US 2007/0005514 A1 Jan. 4, 2007

Related U.S. Application Data

(63) Continuation of application No. 09/810,286, filed on Mar. 16, 2001, now Pat. No. 7,177,849.

(30) Foreign Application Priority Data

Jul. 13, 2000 (EP) .................................. 00480058

(51) Int. Cl.
*G06Q 99/00* (2006.01)
(52) U.S. Cl. .............................. 705/72; 705/50; 705/64; 705/78; 713/156
(58) Field of Classification Search ............. 705/64–79, 705/35–44; 713/156
See application file for complete search history.

(56) References Cited

U.S. PATENT DOCUMENTS 4,837,422 A 6/1989 Dethloff et al.

(Continued)

FOREIGN PATENT DOCUMENTS

EP 2720176 11/1995

(Continued)

OTHER PUBLICATIONS

Meyer et al., "Some Cryptographic Principles of Authentication in Electronic Funds Transfer Systems", 1981, IEEE.

(Continued)

*Primary Examiner*—Jalatee Worjloh
(74) *Attorney, Agent, or Firm*—William Steinberg; Roberts Mlotkowski Safran & Cole, P.C.

(57) ABSTRACT

A method for validating an electronic payment by a credit/debit card in a transaction system. The method includes registering a purchase of an article by a buyer using a credit/debit card associated with at least one PIN code, checking that the at least one PIN code is associated with the number of said credit/debit card provided by said buyer to said seller terminal, checking, by said electronic payment center, whether or not said at least one PIN code is valid, and one of: after the at least one PIN code is found to be valid, checking, by said electronic payment center, whether the electronic payment center has received a pre-validation from a third party; after the at least one PIN code is found to be valid, contacting a third party via a communication network and requesting that the third party validate the purchase; and after the at least one PIN code is found to be valid, contacting a third party via a communication network and requesting said at least one PIN code from the third party. The third party is a prime owner of the credit/debit card.

27 Claims, 2 Drawing Sheets

U.S. PATENT DOCUMENTS

| | | | |
|---|---|---|---|
| 5,285,055 A | | 2/1994 | Oonakahara et al. |
| 5,708,422 A | | 1/1998 | Blonder et al. |
| 5,914,472 A | * | 6/1999 | Foladare et al. ............ 235/380 |
| 5,953,710 A | * | 9/1999 | Fleming ...................... 705/38 |
| 5,963,926 A | | 10/1999 | Kumomura |
| 5,999,596 A | * | 12/1999 | Walker et al. ............ 379/91.01 |
| 5,999,624 A | * | 12/1999 | Hopkins ...................... 705/70 |
| 6,014,650 A | * | 1/2000 | Zampese ..................... 705/44 |
| 6,098,053 A | * | 8/2000 | Slater ........................ 705/44 |
| 6,205,437 B1 | | 3/2001 | Gifford |
| 6,213,391 B1 | * | 4/2001 | Lewis ........................ 235/380 |
| 6,327,578 B1 | | 12/2001 | Linehan |
| 6,748,367 B1 | | 6/2004 | Lee |
| 6,853,987 B1 | | 2/2005 | Cook |
| 7,136,841 B2 | * | 11/2006 | Cook ......................... 705/75 |
| 2001/0039535 A1 | | 11/2001 | Tsiounis et al. |
| 2002/0077837 A1 | | 6/2002 | Krueger et al. |
| 2003/0212642 A1 | * | 11/2003 | Weller et al. ................ 705/67 |

FOREIGN PATENT DOCUMENTS

| | | | |
|---|---|---|---|
| EP | | 2769736 | 4/1999 |
| FR | | 2720176 A1 | 11/1995 |
| FR | | 2769736 A1 | 4/1999 |
| GB | | 2289783 | 11/1995 |
| KR | | 200036972 | 7/2000 |
| WO | | 9945693 | 9/1999 |

OTHER PUBLICATIONS

Non-Final Office Action dated Oct. 10, 2003 for U.S. Appl. No. 09/810,286.
Final Office Action dated Apr. 1, 2004 for U.S. Appl. No. 09/810,286.
Non-Final Office Action dated Oct. 15, 2004 for U.S. Appl. No. 09/810,286.
Final Office Action dated May 9, 2005 for U.S. Appl. No. 09/810,286.
Non-Final Office Action dated Sep. 12, 2005 for U.S. Appl. No. 09/810,286.
Final Office Action dated Jan. 18, 2006 for U.S. Appl. No. 09/810,286.
Non-Final Office Action dated Apr. 6, 2006 for U.S. Appl. No. 09/810,286.
Notice of Allowance dated Jan. 9, 2007 for U.S. Appl. No. 09/810,286.

* cited by examiner

METHOD FOR VALIDATING AN ELECTRONIC PAYMENT BY A CREDIT/DEBIT CARD

CROSS-REFERENCE TO RELATED APPLICATIONS

The present application is a continuation of parent U.S. patent application Ser. No. 09/810,286, filed on Mar. 16, 2001, the disclosure of which is expressly incorporated by reference herein in its entirety. Further, the present application claims priority under 35 U.S.C. §119 of European Patent Application No. 00480058.7 filed on Jul. 13, 2000, the disclosure of which is hereby incorporated by reference herein in its entirety.

TECHNICAL FIELD

The present invention relates generally to the methods and systems for enhancing the security of the electronic transactions using a credit or debit card and relates in particular to a method for validating an electronic payment by a credit/debit card.

BACKGROUND OF THE INVENTION

The electronic payment is more and more used to perform transactions, in particular through the Internet network. In such a case, a seller provides an electronic catalog for selling articles or even services through Internet. Any buyer connected by a terminal to Internet can consult the catalog and purchase the proposed articles by sending his order to the seller through Internet together with his credit/debit card number (herein after referred to as "card number").

Generally, the payment is validated by using an electronic payment center which is also connected to the Internet network. Such a center is connected to the banking companies and authorized/certified by these banking companies. At the same time the buyer orders the articles to the seller, he transmits his PIN (Personal Identification Number) code to the electronic payment center together with the identification of the purchased articles, the date and the time of the purchase. Upon receiving the order, the seller sends the identification of the articles, the time and date and the card number to the electronic payment center which can then validate the payment after checking that the PIN code number corresponds to the card number.

But, in such an electronic payment, it is always the buyer who decides and validates the transaction. Now, considering the increase of electronic payment through the Internet network, and considering the need that such a system may be available to several people depending upon a single credit like to young people (children) or old people (grandparents) who are sometimes overtaken by the today techniques, it is a problem not having such a transaction being validated by the prime owner of the credit card, or in a general way by a third party.

SUMMARY OF THE INVENTION

Accordingly, the main object of the invention is to achieve a method for validating by a third party an electronic payment using a credit/debit card.

The invention relates therefore to a method for validating an electronic payment by a credit/debit card in a transaction system comprising a seller terminal for registering a sale of one or several articles by a buyer using a card associated with a plurality of PIN codes and an electronic payment center connected to the seller terminal by the Internet network, the method consisting for the electronic payment center to check that a buyer PIN code which is provided by the buyer to the center is associated with the number of the credit/debit card provided by the buyer to the seller terminal. Such a method is characterized in that it further comprises the step automatically carried out by the electronic payment center of checking with a third party whether the buyer PIN code is valid.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
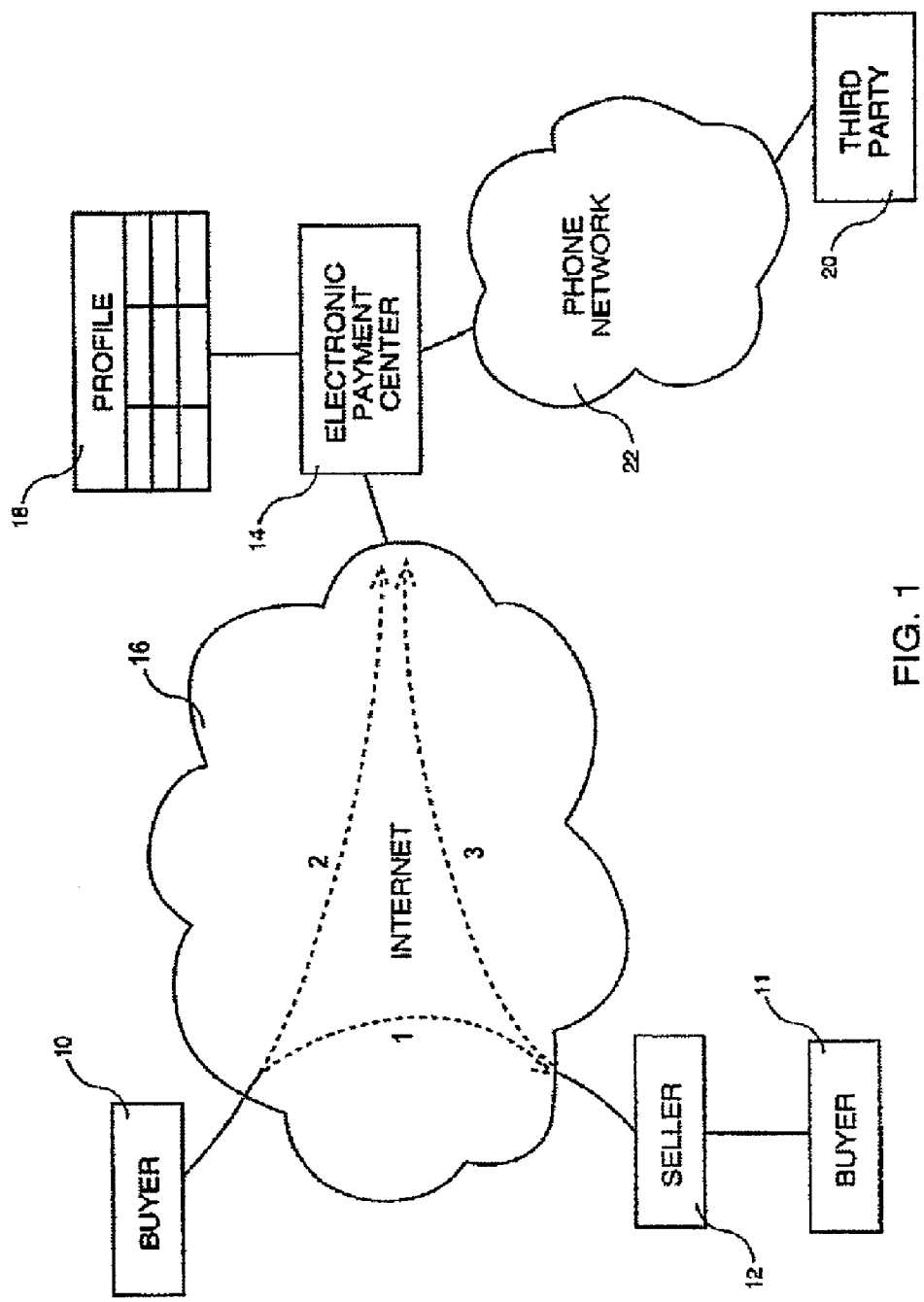
FIG. 1 is a block-diagram of a system wherein a buyer orders articles to a seller and performs the payment to an electronic payment center through the Internet network.

According to the invention, a buyer terminal 10, a seller terminal 12 and an electronic payment center 14 are all connected to the Internet network 16. When the buyer wants to order articles after having consulted an electronic catalog, he sends the order through the network to the seller terminal 12. For this, he sends with an encryption key 1 provided by the seller at the initialization of the transaction, the necessary information that is the credit/debit card number, the identification of the ordered articles and the time and date of the purchase. At the same time, the buyer sends through the Internet another message which is encrypted by an encryption key 2 to the electronic payment center 14, this message containing the identification of the purchased articles, and the time and date of the purchase. After receiving the purchase order, the seller terminal 12 sends with an encryption key 3 the information necessary to achieve the electronic payment, that is the identification of the articles and the time and date of the purchase, and also a PIN code number. Note that encryption key keys 2 and 3 have been previously provided by the electronic payment center to respectively the buyer 10 and the seller 12.

It must be noted that generally the buyer 10 is remote from the seller and the transaction between them is made through Internet. But it is possible that a buyer 11 be in the seller shop. In such a case, the necessary information is directly provided by the buyer and the information containing the PIN code is transmitted from the terminal seller 12 to the electronic payment center.

After receiving the PIN code number from the buyer 10, the electronic payment center 14 checks whether the PIN code number being received is a valid PIN code by checking in profile tables 18, the entries of which are the card numbers, and giving some other information for each PIN code such as the authorized amount. If so, the electronic payment center 14 launches a validation process by contacting a third party 20 through a phone network 22. It must be noted that such a phone network is preferably a wireless phone network wherein the third party 20 is the owner of a mobile phone because the third party can be always contacted (assuming the third party's mobile phone is always activated). Note also that the phone network could be replaced by any kind of transmission network, and in particular, the Internet network.

Figure 2:
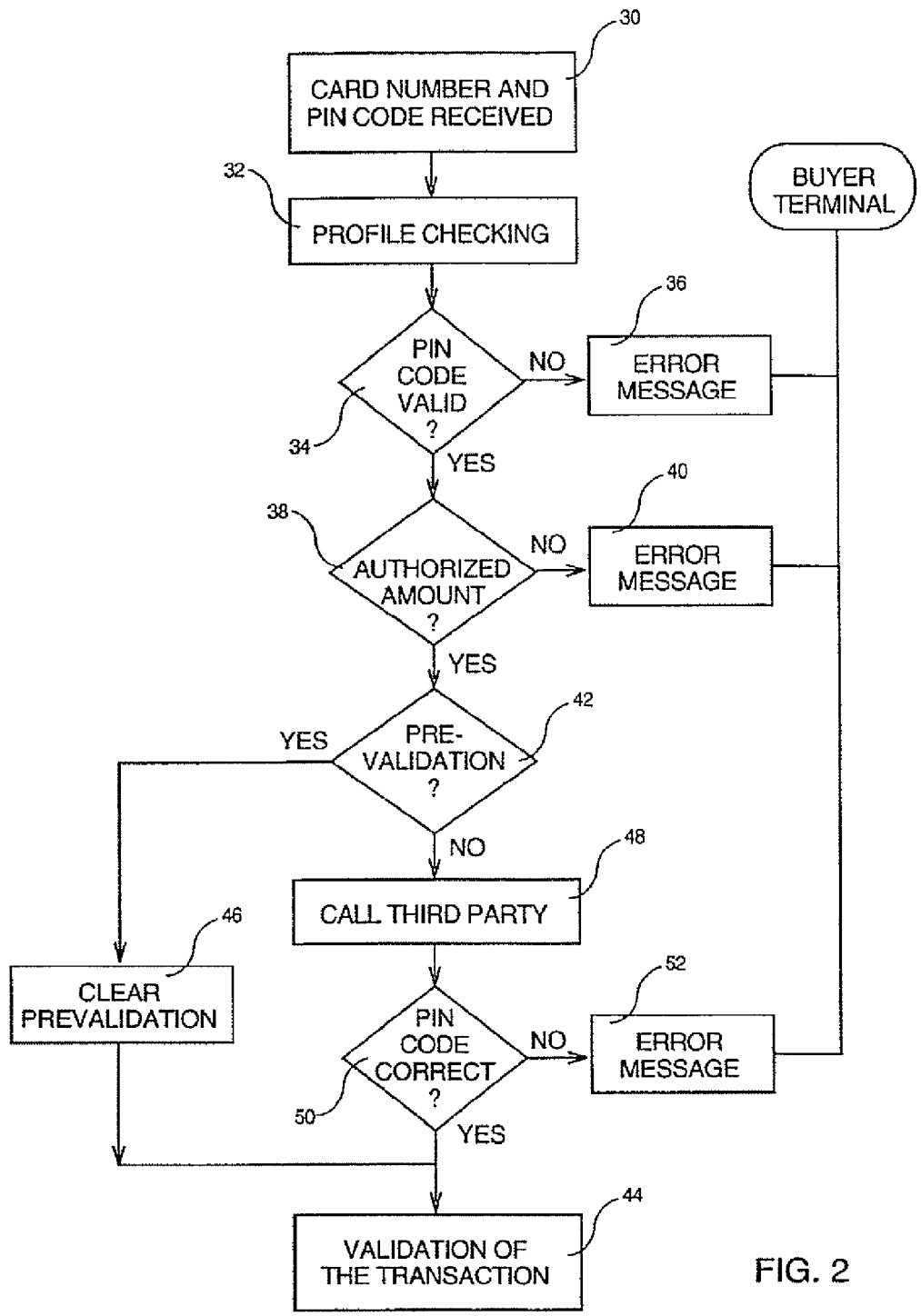
FIG. 2 is a flow chart of the steps performed in the electronic payment center in order to achieve the method according to the invention.

The steps of the method according to the invention, performed in the electronic payment center are now described in reference to the flow chart of FIG. 2. As already mentioned, the card number and the PIN code of the buyer are first received (step 30) by the electronic payment center from respectively the buyer and the seller. After receiving this information, the computer of the electronic payment center performs a profile checking (step 32) by consulting a profile table (see FIG. 1). In fact, there are different PIN codes corresponding to the card number which can, for example, be derived from the original PIN code by some algorithm like a scrambling algorithm. Thus, the prime owner of the card may give to other people a copy of the card (for example, a man can give one copy to his wife and one copy to each of his children). All these people have different PIN codes and so, they will be differently identified during a payment transaction.

Coming back to FIG. 2, the profile tables enable the validating party to know whether the PIN code provided by the buyer is valid (step 34). If not, an electronic error message is sent to the buyer terminal (step 36). If the PIN code corresponds to one of the valid codes associated with the card, the computer of the electronic payment center can check additional information within the profile tables, for example, the maximum amount authorized for this PIN code and whether the price of the purchased articles is less than the maximum amount (step 38). If not, an electronic error message is sent to the buyer terminal (step 40).

When the requested amount is below the authorized maximum, the computer of the electronic payment center checks whether it has received in a previous interval of time (for example one hour) a prevalidation from the third party including the delivery of the PIN code (step 42). It must be noted that this prevalidation can occur at any time and also canceled at any time by the third party calling the computer of the electronic payment center and through interactive dialog using a phone keyboard.

When such a prevalidation has been received, the computer of the electronic payment center validates the transaction (step 44) after having cleared (step 46) the prevalidation information (so, it is no more valid for a potential next transaction). When there is no prevalidation, the computer calls the third party (step 48) and through artificial voice, asks for the authorized PIN code to determine whether the PIN code provided by the buyer is a correct PIN code (step 50). If so, the transaction is validated (step 44). If the PIN code provided by the third party does not correspond to the PIN code provided by the buyer, an electronic error message is sent to the buyer terminal (step 52).

What is claimed:

1. A method for validating an electronic payment by a credit/debit card in a transaction system, comprising:
   registering a purchase of at least one article by a buyer using a credit/debit card associated with at least one PIN code at a seller terminal connected to an electronic payment center by a communication network;
   receiving, at the electronic payment center, information associated with the purchase from the buyer;
   checking, by the electronic payment center, that the at least one PIN code which has been received by said electronic payment center from said buyer is associated with the number of said credit/debit card provided by said buyer to said seller terminal;
   checking, by said electronic payment center, whether or not said at least one PIN code is valid; and
   after the at least one PIN code is found to be valid, contacting a third party via a communication network and requesting said at least one PIN code from the third party,
   wherein the third party is a prime owner of the credit/debit card.

2. The method according to claim 1, wherein said buyer has a terminal which is connected to the communication network and said terminal is configured to transmit the number of the credit/debit card.

3. The method according to claim 1, wherein the credit/debit card number and the at least one PIN code which have been provided to said seller terminal by said buyer are transmitted to said electronic payment center to check whether the at least one PIN code is associated with said credit/debit card number.

4. The method according to claim 3, wherein said electronic payment center checks in at least one profile table whether said PIN code is associated with the credit/debit card number.

5. A system for validating an electronic payment by a credit/debit card comprising a system adapted for carrying out the steps of the method according to claim 1.

6. The method of claim 1, wherein each PIN code of the at least one PIN code is used only once and a different PIN code of the at least one PIN code is used for a later transaction.

7. The method of claim 1, wherein the at least one PIN code is associated with two or more members of a group and the group is associated with the number of the credit/debit card.

8. The method of claim 7, wherein the at least one PIN code is different for different members of the group, and wherein the at least one PIN code authorizes a different purchasing amount for the different members of the group.

9. The method of claim 7, wherein the third party is a member of the group and the third party limits a transaction involving the credit/debit card to a pre-determined purchasing amount.

10. The method of claim 1, further comprising checking, by said electronic payment center, whether the electronic payment center has received a pre-validation from the third party.

11. A method for validating an electronic payment by a credit/debit card in a transaction system, comprising:
    registering a purchase of at least one article by a buyer using a credit/debit card associated with at least one PIN code at a seller terminal connected to an electronic payment center by a communication network;
    receiving, at the electronic payment center, information associated with the purchase from the buyer;
    checking, by the electronic payment center, that the at least one PIN code which has been received by said electronic payment center from said buyer is associated with the number of said credit/debit card provided by said buyer to said seller terminal;
    checking, by said electronic payment center, whether or not said at least one PIN code is valid; and
    after the at least one PIN code is found to be valid, contacting a third party via a communication network and requesting said at least one PIN code from the third party, wherein the third party is a prime owner of the credit/debit card.

12. A system for validating an electronic payment by a credit/debit card comprising a system adapted for carrying out the steps of the method according to claim 11.

13. The method according to claim 11, wherein each PIN code of the at least one PIN code is used only once and a different PIN code of the at least one PIN code is used for a later transaction.

14. The method according to claim 11, wherein the at least one PIN code is associated with two or more members of a group and the group is associated with the number of the credit/debit card.

15. A method for validating an electronic payment by a credit/debit card in a transaction system, comprising:
  registering a purchase of an article by a buyer using a credit/debit card associated with at least one PIN code at a seller terminal connected to an electronic payment center by a communication network;
  receiving, at the electronic payment center, information associated with the purchase from the buyer;
  checking, by the electronic payment center, that the at least one PIN code which has been received by said electronic payment center from said buyer is associated with a number of said credit/debit card provided by said buyer to said seller terminal;
  checking, by said electronic payment center, whether or not said at least one PIN code is valid; and
  after the at least one PIN code is found to be valid, performing each of:
  checking, by said electronic payment center, whether the electronic payment center has received a pre-validation from a third party; and
  contacting a third party via a communication network and requesting that the third party validate the purchase using at least one PIN code from the third party, wherein the third party is a prime owner of the credit/debit card.

16. The method according to claim 15, further comprising transmitting, with the seller terminal, the number of the credit/debit card.

17. The method according to claim 15, further comprising checking, by the electronic payment center, whether the at least one PIN code is associated with the credit/debit card number in at least one profile table.

18. A system for validating an electronic payment by a credit/debit card comprising a system adapted for carrying out the steps of the method according to claim 15.

19. The method according to claim 15, wherein each PIN code of the at least one PIN code is used only once and a different PIN code of the at least one PIN code is used for a later transaction.

20. The method according to claim 15, wherein the at least one PIN code is associated with two or more members of a group and the group is associated with the number of the credit/debit card.

21. The method according to claim 1, wherein the receiving information comprises receiving an encrypted message at the electronic payment center.

22. The method according to claim 21, wherein the electronic payment center receives the pre-validation from the third party in the form of the at least one PIN code from the third party.

23. The method according to claim 21, wherein, when the electronic payment center does not receive the pre-validation from the third party, the electronic payment center contacts the third party and obtains the at least one PIN code from the third party in order to compare it to the at least one PIN code provided by said buyer.

24. The method according to claim 1, wherein the information comprises the at least one PIN code.

25. The method of claim 24, wherein the information includes an identification of the purchase and a date and time of the purchase.

26. The method of claim 25, wherein the information is sent at a same time that the buyer sends an order through the network to the seller terminal.

27. The method of claim 26, wherein the information is encrypted.

* * * * *